United States Patent [19]

Hemmings

[11] 4,135,847
[45] Jan. 23, 1979

[54] COMPOSITE DRILL FOR DRILLING CIRCUIT BOARDS

[75] Inventor: David T. Hemmings, Orange, Calif.

[73] Assignee: Tulon, Inc., Gardena, Calif.

[21] Appl. No.: 828,504

[22] Filed: Aug. 29, 1977

[51] Int. Cl.² ............................................. B23B 51/02
[52] U.S. Cl. .................................... 408/226; 408/704; 407/32
[58] Field of Search ............... 408/226, 199, 144, 704, 408/713; 76/108 R, 108 T; 145/61 R, 50 R; 407/32; 30/342, 344; 81/71

[56] References Cited

U.S. PATENT DOCUMENTS

| | | | |
|---|---|---|---|
| 2,985,209 | 5/1961 | Novelo | 145/61 R |
| 3,751,176 | 8/1973 | von Hollen | 408/226 |
| 3,790,297 | 2/1974 | Maursey | 408/226 |

Primary Examiner—Gil Weidenfeld
Attorney, Agent, or Firm—Gausewitz, Carr & Rothenberg

[57] ABSTRACT

This invention provides a drill, drilling apparatus, and methods for their use, in which a plastic shank of uniform external diameter is molded onto one end of an insert made of hard drill material. The end of the insert which is encompassed by plastic has dimensions and configurations designed to prevent axial and rotational slippage of the insert inside the plastic shank when the drill is in use. The unattached end of the insert is provided with a cutting tip and drilling flutes. High speed automatic drilling and drill-changing operations are described in which a number of drills having different flute diameters, but uniform shank diameters, are used consecutively.

12 Claims, 7 Drawing Figures

COMPOSITE DRILL FOR DRILLING CIRCUIT BOARDS

BACKGROUND OF THE INVENTION

This invention relates to composite drills, especially drills designed for use in automatic drill-changing equipment. More particularly, it relates to such drills of small sizes for use in drilling holes in printed circuit boards.

It is known to use drills in a wide range of sizes and types, and from a wide range of materials of varying degrees of hardness, depending on the intended use.

When very small drills have been used, persistent problems have plagued the users, especially in printed circuit board manufacturing industries where extremely hard drills are commonly used. Suitably hard, durable drills, such as those made from tungsten carbide, have proved to be extremely brittle and subject to breakage from being dropped, even short distances, on hard surfaces. This breakage, even with utmost precautions and care, seems to occur at an irreducible frequency, such that additional safeguards are counter-productively expensive (as, for example, attempting to provide soft, resilient drop surfaces on all working areas).

Breakage expenses are aggravated even more by the heavy weight and large quantity of expensive tungsten carbide (or similar materials) used in each drill. For example, with small drills having diameters less than about ¼ inch (6.35mm), the actual working portion of a drill may constitute as little as 5%, or even less, of the total material in the drill. Heretofore, the additional 95% of expensive, heavy drill material was considered indispensable to provide a drill shank of sufficient size, hardness, durability, and dimensional stability to be compatible with precision collets. Such qualities are of special importance in the fine, precision drilling operations of the circuit board industry, especially where automated high-speed drill-changing techniques are employed.

An example of such drill-changing techniques is illustrated in U.S. Pat. No. 3,973,863, which shows highly automated drilling devices and processes in which one or more collets are each programmed to sequentially pick up a drill, use it in drilling work, such as drilling circuit boards, return the drill to its storage location, and pick up another drill to continue the sequence. For such operations, the shanks of all the drills in the set must be matched, that is, of precisely uniform size to compatibly match the collet. As shown in U.S. Pat. No. 3,973,863, this uniformity is achieved by greatly enlarging the shanks of the drills to a constant large diameter to fit the collet (regardless of the working diameter of the drill). Such enlarged shanks have been virtually essential for precision gripping and centering of the drill to avoid eccentric drill motion and to achieve the fine-tolerance drilling operations required in circuit board manufacture.

It has been found that when, e.g., drills having large shanks are composed entirely of heavy material, such as tungsten carbide, breakage upon impact is nearly inevitable if the drills are dropped even short distances. Both the heavy weight of the enlarged shanks and their incapacity to absorb shock, i.e., their lack of resilience, contribute to the breakage.

Another problem encountered when shanks are made of extremely hard materials, such as tungsten carbide, is the difficulty of properly setting collet gripping pressures. It is virtually impossible to know when a tungsten carbide shank is gripped with excessive pressure, since its surface will not dent, even when potentially damaging, excessive stresses are imposed upon it. Moreover, overtightening the collet gripping pressures can damage the collet or greatly increase its wear-rate and shorten its operable life.

Despite the long history of repeated efforts to improve drills, prior art techniques have failed to overcome these problems.

SUMMARY OF THE INVENTION

The present invention contemplates an improved drill, drilling apparatus, and methods for their use, which overcome the prior art problems noted above.

This invention contemplates a drill comprising a rigid, right circular cylindrical insert and a right circular cylindrical plastic shank, which is molded around and rigidly attached to one end of the insert. The cylindrical insert comprises an attaching end portion (i.e., the part attached inside the plastic shank) and an unattached, working end portion. The working end portion has a cutting tip and drilling flutes, which are positioned between the cutting tip and the attaching end portion. The attaching end portion of the cylindrical insert is configurated or shaped to eliminate both axial and rotational slippage of the insert, relative to the plastic shank, when the drill is in use.

The molded plastic shank is adapted for compatible insertion within, and attachment to, conventional drilling machine collets, and is cylindrical in shape. The invention contemplates using shanks made of relatively lightweight plastics, having sufficient dimensional stability, hardness, durability, and mechanical strength to render them essentially inflexible to torsional stresses when in use, and highly resistant to wear. The plastic shanks can be held in the collets with considerably less clamping pressure than is required to hold steel or carbide shanks. Moreover, it is virtually impossible to overstress plastic since it will eventually deform and relieve enough stresses to avoid internal damage or excessive wear to the collet. The plastics used to form the shanks are preferably reinforced, as hereinafter described.

The cylindrical inserts are composed of conventional high-speed steels, or other hard materials used in commercial drills, such as cobalt and tungsten steels. Tungsten carbide provides a particularly preferred insert for use in this invention; however, the advantages of the invention can be achieved using any very high-hardness materials which are normally susceptible to breakage in small diameters due to their extreme brittleness and inflexibility.

The attaching end portion of the cylindrical insert is shaped or provided with a segment having a non-circular cross-section, which is completely filled and encompassed by the plastic shank to prevent or resist rotational slippage of the insert, relative to the shank, when the drill is in use. The attaching end portion is also provided with engaging surfaces positioned substantially transverse to the axis of the insert, which engage the shank and prevent axial slippage of the insert relative to the shank.

In more specific aspects, the invention contemplates providing in the attaching end portion of the insert a unitary configuration in the form of a key flat, which comprises both a flattened surface that renders the insert non-circular in cross-section and transverse engaging surfaces, thus being adapted to prevent both rotational and axial slippage between the insert and the shank.

The key flat is a shaped section or identation in the cylindrical insert comprising a generally planar base, which is positioned substantially parallel to the axis of the insert, and transverse surfaces which are positioned transverse to the ends of the planar base, and connect the base to the outer surface of the attaching end portion of the insert.

This invention also contemplates providing matched sets of collets and drills, i.e., drills having inserts whose working ends are of various diameters, but whose plastic shanks have diameters which are controlled within a constant, predetermined range of fine tolerance for compatible fit with a given matched size of collet. Such matched sets are essential for high-speed automatic drill-changing operations in circuit board drilling processes, as described in detail hereinafter.

DESCRIPTION OF THE PREFERRED EMBODIMENTS

Figure 1:
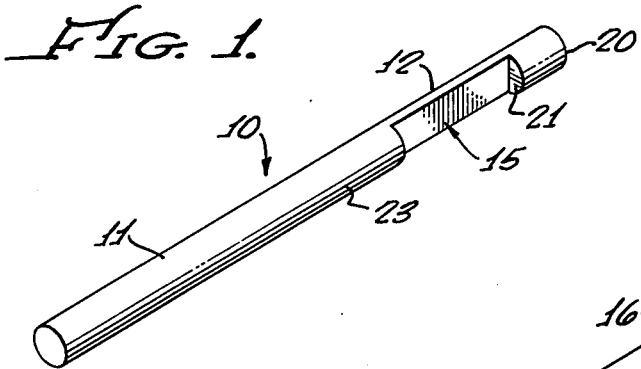
FIG. 1 is a perspective view of a cylindrical insert provided with a key flat.
Figure 2:
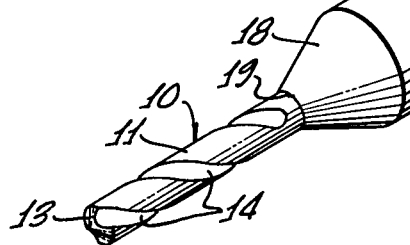
FIG. 2 is a perspective of the insert of FIG. 1, encompassed within, and attached to, a plastic shank and having drilling flutes and a cutting tip on the unattached end.
Figure 3:
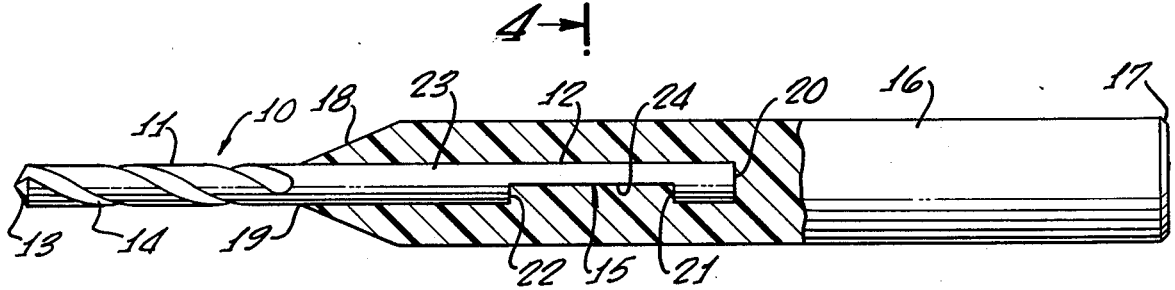
FIG. 3 shows a partially broken-away side elevation view of the drill.

The present insert 10, as depicted in FIGS. 1, 2 and 3, is a rigid right circular cylinder, or rod, of substantially uniform diameter, composed of conventional, very hard drill material, such as a high-speed steel or tungsten carbide. For circuit board drills, the diameter of the insert 10 ranges less than ¼ inch (6.35mm), generally less than ⅛ inch (3.17mm), and preferably ranges from about 0.028 inch (0.70mm) to 0.052 inch (1.30mm). The overall length of the insert 10 ranges from about 5/8 inch (15.9mm) to about 2 inches (50.8mm), and preferably from about 1 inch (25.4mm) to about 1 1/2 inches (38.1mm). Insert 10 has a working end portion 11 and an opposite end portion 12 for attaching the insert to the shank 16. FIGS. 2 and 3 show working end portion 11 with a cutting tip 13 and drilling flutes 14 ground therein.

The drilling flutes 14 extend from the tip 13 towards the other end portion 12 of the insert. Although the proportion of the insert which is fluted is not critical, it is generally preferred to terminate the flutes substantially at or near the intersection 19 where the insert 10 enters the plastic shank 16.

End portion 12 of insert 10 has a generally smooth and cylindrical surface 23 except for a key flat 15 which is ground into the side of the insert.

As illustrated in FIG. 2 and FIG. 3, key flat 15 is completely filled and encompassed by the plastic shank 16, which can be cast or molded about the insert 10 by conventional plastic molding techniques. Typically, when the thermoplastic resins are used, the plastic shank 16 is injection-molded about the insert 10 in a die of predetermined size and shape, as hereinafter described. When the drills of this invention are to be used in automatic drill-changing apparatus, especially using small drills of less than about ¼ inch (6.35mm) working diameter, it is important that the shank 16 be provided with a tapered section 17 at the end opposite the insert 10. This tapered section 17 is typically a conventional frustoconically shaped portion, designed for easy, precise, and accurate entrance and positioning in a precision collet of the automatic drilling apparatus. A tapered section 18 may also be provided at the other end of the shank 16 from which the insert 10 protrudes at intersection 19.

Shank 16 can be prepared from any moldable plastic resin which can be hardened to provide the essential characteristics of dimensional stability, hardness, durability, and mechanical strength required to obtain precision performance from the drill. Those skilled in the plastics molding art can readily determine a wide variety of suitable plastics, and the invention is not intended to be limited to any particular plastic or plastic molding process. Specifically, it is contemplated that plastic shanks 16 prepared from polyphenylene oxides, polyphenylene sulfides, polysulfones, alkyds, polyesters, epoxies, phenolics, polystyrenes and polycarbonates may be used.

Depending upon the hardness and durability of particular plastics, it may be desirable to reinforce them with fiber additives. Typically, fibers of glass, or of metals (including cobalt, aluminum, tungsten, nickel, or iron), and of boron or various refractory materials, including aluminum silicate, aluminum oxide, or silicon carbide, are contemplated for use. Such reinforcing agents are well-known in the plastics art. The fibers range in diameter down to 1 micron or even smaller, and range in length from a few millimeters to 2-3 cm. Blends of plastics and reinforcing fibers have greatly enhanced physical characteristics that are desirable in high-performance machine operations using the drills of this invention. Such fibers are added in an amount sufficient to provide about 20% to 60% by weight of the plastic shank. A particularly preferred material for plastic shank 16 can be prepared using polyphenylene sulfide resin, reinforced with from 35% to 45% by weight of glass fibers. (An example of such plastic is that marketed by Phillips Petroleum Corp. under the trademark RYTON R4.)

When the shank 16 is molded about the insert 10, it is important that a sufficient length of insert be encompassed within the shank to resist the rotational or torsional stresses generated when the drill is in use. In other words, the distance from the intersection 19, where the insert enters shank 16, to the tip 20 of the inserted end should provide sufficient surface contact, together with the key flat 15 to lock the insert securely in position. In preferred circuit board drills the inserted end ranges in length from about ½ inch (12.7mm) to about 1¼ inches (31.8mm), and the working end 11 ranges in length from about ⅛ inch (3.17mm) to about ¾ inch (19.0mm).

When the drill is in use, the key flat 15 serves the dual functions of preventing both rotational movement and axial movement of insert 10, relative to shank 16.

As illustrated in FIG. 3, key flat 15 has a substantially flat or planar base or surface 24, shaped or milled into end portion 12 of insert 10 at a depth from cylindrical surface 23 of end portion 12 of from about 30% to about 50% of the diameter of end portion 12. Some variation may be permissible; however, with a too shallow key flat, rotation of the insert is possible, and with an excessively deep key flat, severe stresses on the drill can fracture end portion 12 at the key flat.

Figure 4:
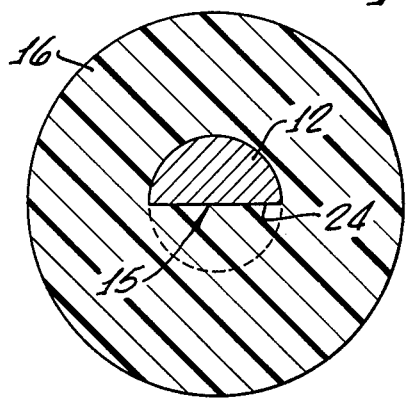
FIG. 4 is a sectional view taken along line 4—4 of FIG. 3.

FIG. 4 illustrates how the flattened surface 24 renders end portion 12 of insert 10 sufficiently non-circular to securely lock the insert to the plastic material of shank 16 to prevent any significant rotational motion. It is to be understood that while flattened surfaces, such as surface 24, are preferred, other shapes may also render end portion 12 of insert 10 sufficiently non-circular to prevent rotation relative to shank 16. For example, a waffled surface, a concave surface, or even a slightly convex surface may also be suitable for some uses.

FIG. 3 also shows radial surfaces 21 and 22 of key flat 15 which connect the flat surface 24 to the cylindrical surface 23 of insert 10. These radial surfaces engage the plastic material and prevent any axial motion by the insert 10 relative to shank 16.

Radial surfaces 21 and 22 should be aligned substantially transverse to the axis of insert 10 to maximize resistance to slippage. For example, if surfaces 21 and 22 are not substantially transverse to the axis of insert 10, it may be possible, under heavy drilling stresses, for them to function somewhat as drill flutes, thus permitting the insert 10 to spiral its way out of the shank 16. Similarly, it is preferred that surfaces 21 and 22 be formed or ground substantially perpendicularly from the outer surface 23 of insert 10 toward flattened surface 24; however, it is also contemplated that surfaces 21 and 22 may connect surfaces 23 and 24 at nonperpendicular angles. (That is, the key flat 15 may be slightly shorter when measured at the outside surface 23 than when measured at the flattened surface 24, or vice versa.)

The axial length of the key flat 15 can vary over a wide range and perform successfully; however, it is important that surface 21 of key flat 15 be at least about 1 insert diameter from end 20 of the insert, and that surface 22 be at least about 1 insert diameter from intersection 19, where insert 10 leaves shank 16. If the key flat is extended beyond these points, a weakening of the holding power of the shank 16 on the insert 10 can result, due to fracture or distortion of the plastic shank material or of the insert 10 itself. Generally this axial length of the key flat ranges from about ⅛ inch (3.17mm) to about ¾ inch (19.0mm), and it has been found that for outstanding drills particularly suited for use in drilling circuit boards, axial distances in the key flat 15 between surfaces 21 and 22 can be surprisingly small, ranging from about 3/16 inch (4.76mm) to about ¼ inch (6.35mm).

Figure 5:
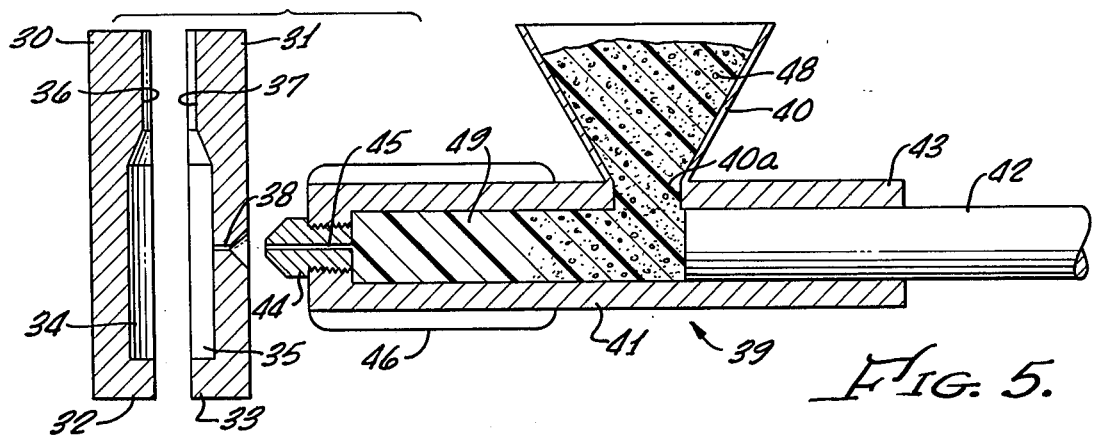
FIG. 5 is a side elevation sectional view of injection molding apparatus, with molds open preparatory to molding the plastic shank of this invention.
Figure 6:
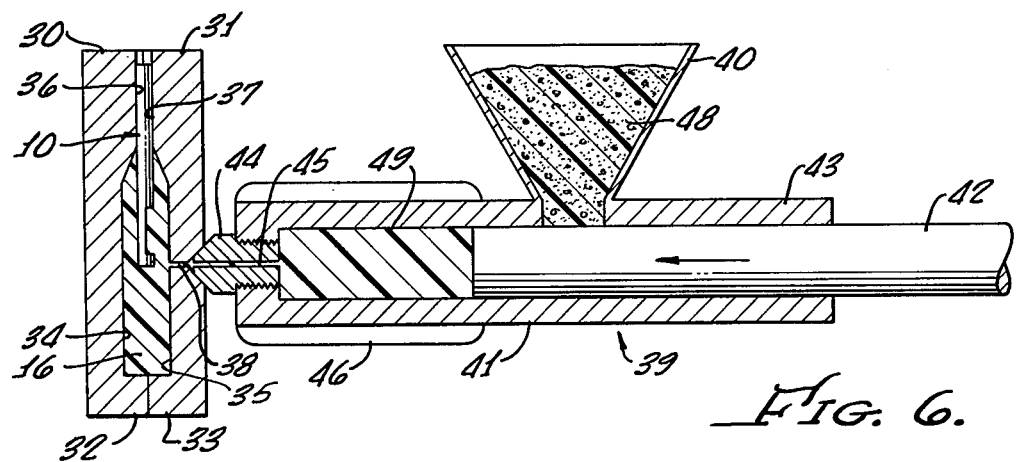
FIG. 6 is a view similar to FIG. 5, but the molds have been closed and a plastic shank has been injected about the insert to form the completed drill.

FIG. 5 and FIG. 6 illustrate schematically a method for injection molding plastic shank 16 about insert 10. Referring to FIG. 5, therein is shown half molds 30 and 31 having bodies 32 and 33, respectively, composed of conventional steel mold material. Within the bodies 32 and 33 are cavities 34 and 35 which form a generally cylindrical cavity the shape of shank 16 when the molds are aligned and placed together. The cavities 34 and 35 are connected to channels 36 and 37 which are adapted to contain insert 10 securely when the molds are assembled.

Half mold 31 includes inlet 38 for receiving molten plastic from feeder assembly 39. Feeder assembly 39 consists of a feed hopper 40, a cylinder 41, and a plunger 42 fitted within end portion 43 of cylinder 41. Nozzle 44 is threaded into cylinder 41 at the end opposite plunger 42. Nozzle 44 has a channel 45 aligned and adapted for fluid communication with the inlet 38 to half mold 31.

Cylinder 41 is also equipped with a heating means 46 along the end portion opposite plunger 42.

To prepare for the injection molding operation, plunger 42 is withdrawn from cylinder 41 beyond hopper 40 and pellets of plastic resin 48, reinforced as desired with reinforcing agents (such as glass fibers), are loaded into hopper 40. The pellets pass through hopper outlet 40a into the cylinder 41. Heating means 46 heats cylinder 41 to a sufficient temperature to melt the plastic pellets to form a molten mass 49 ready for injection.

FIG. 6 illustrates the method by which the molten mass of plastic 49 can be injection molded about an insert to form a plastic shank thereon. As shown in FIG. 6, half molds 30 and 31 are assembled about a drill insert 10 to securely position the insert for alignment within the half molds. The assembled half molds are then positioned against nozzle 44 to receive molten plastic. The actual injection operation involves moving plunger 42 into cylinder 41 to drive part of molten mass 49 through channel 45 of nozzle 44 into the inlet 38 of half mold 31 to thereby fill the cavities within the half molds and form shank 16. The bodies of half molds 30 and 31 are maintained by cooling means (not shown) at a cooler temperature than the mass of molten plastic 49, thus causing the plastic to harden into a solid plastic shank 16. Pressure is maintained on plunger 42 until shank 16 is hardened, to prevent shrinkage of the shank or leakage of molten plastic back through inlet 38 into the injection apparatus. After the shank 16 has hardened, the half molds are opened as shown in FIG. 5, and the unified insert 10 and shank 16 is removed from the molds. The process is then repeated.

It is to be understood that the particular type of molding apparatus used is not crucial to the successful manufacture of the drills of this invention, and the foregoing simplified description is for illustrative purposes only. It is contemplated, for example, that modern high-speed injection molding apparatus using screw feeders or other feeding techniques instead of plungers, which simultaneously fill multiple molds and eject the finished molded items in continuous automated sequences, may be used.

For some low-precision operations, it may be feasible to use a drill whose flutes 14 and cutting tip 13 are preground on the insert 10 prior to molding the shank 16 about the insert. However, for high-precision operations, such as those involved in automatic circuit board drilling processes, it is important first to mold the shank 16 about the end 12 of the insert and thereafter to grind the flutes 14 and provide the cutting tip 13 on end 11. In such a preferred embodiment, the shank is molded to the approximate ultimate shape and size desired, and then the shank is precisely ground to the exact diameter and form needed for use with precision collets, e.g., using a centerless grinder. Thereafter, the working end 11 of insert 10 can be ground to provide the drilling flutes 14 in precise concentric relation to the shank 16. In other words, the working end of the finished drill will be accurately centered within the shank to minimize eccentric drilling action, wobble, or run-out, when the drill is in use.

Figure 7:
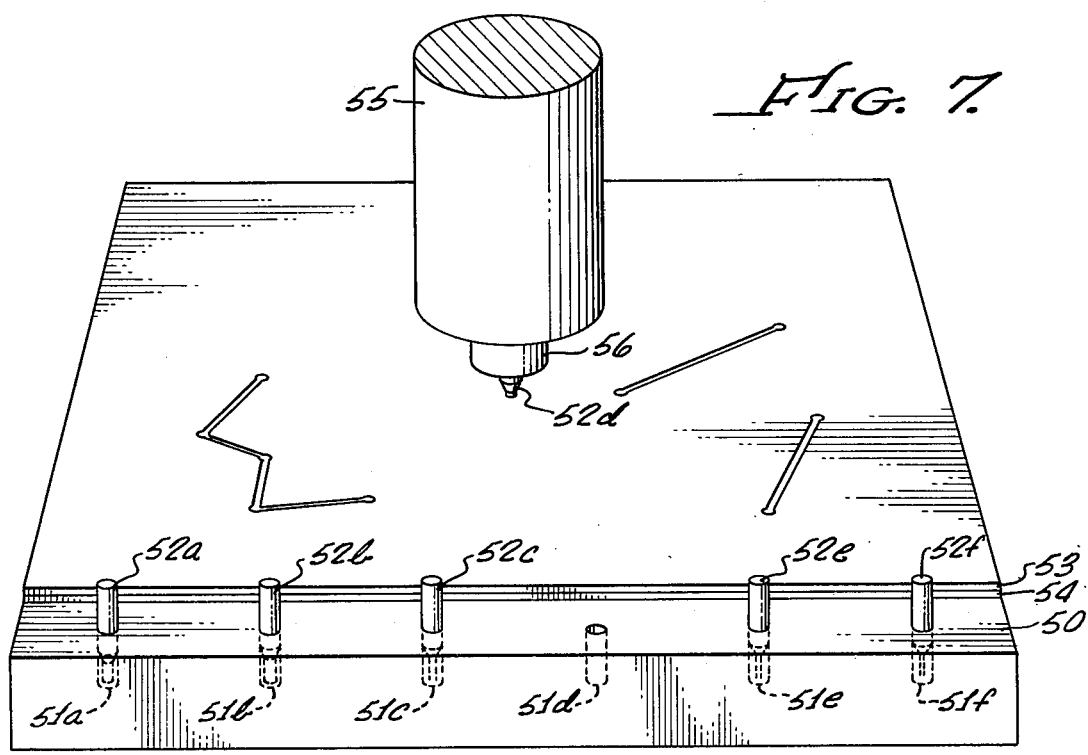
FIG. 7 is a perspective view illustrating a circuit board drilling operation, using a matched set of drills in a collet.

The most preferred embodiment of this invention contemplates an automated drill-changing assembly, including a collet and a matched set of drills whose shanks are of precise, uniform dimensions, while the working ends of the inserts are of various diameters. Such an assembly is illustrated in FIG. 7, wherein there is depicted a tooling plate 50, having bored therein a number of storage receptacles 51a–51f for receiving composite drills 52a–52f made in accordance with the invention. While six drills are shown in FIG. 7, it is to be understood that any number of matched drills may be used, although the sets will generally have from 2 to about 16 drills. Outstanding high speed operations can be readily achieved with excellent flexibility using about 4 to 8 drills per matched set.

Various types of holders (not shown) may be used to position the various drills 52a–52f in the receptacles 51a–51f. Such holders are known to the art, as illustrated, for example, in U.S. Pat. No. 3,973,863. The plastic shanks of the various drills 52a–52f are of precise, uniform diameter, ranging from about 1/16 inch (1.59mm) to ¼ inch (6.35mm). Variations in shank diameters between drills are less than about 0.001 inch (0.025mm), preferably less than about 0.0005 inch (0.013mm). The working ends of the drills have diameters less than about ¼ inch (6.35mm), generally less than ⅛ inch (3.17mm), and preferably are in the range from about 0.028 inch (0.70mm) to 0.052 inch (1.30mm), depending on the sizes needed for drilling the particular work project.

Mounted upon the tooling plate 50 are one or more circuit boards 53 positioned over a backup board 54. The circuit boards and backup board are securely held, or clamped, in place on tooling plate 50 (by means not shown).

Depicted above circuit board 53 is a spindle assembly 55, having a collet 56 which grips drill 52d, which, as illustrated, has been removed from receptacle 51d.

In an automated drilling operation, the tooling plate 50 is mounted on a movable table (not shown) and the table and spindle assembly 55 and collet 56 are driven and controlled by a programmed driving and controlling means (not shown) to follow a predetermined drilling sequence. In the sequence, the spindle assembly 55 descends and causes drill 52d to drill through circuit boards 53 until the drill enters backup board 54, which functions to permit the drill to pass completely through the circuit boards without striking tooling plate 50. The spindle assembly 55 then lifts and withdraws the drill 52d from the circuit boards 53. The table carrying tooling plate 50 then moves repeatedly to reposition the circuit boards under the drill 52d, and additional holes are drilled according to a predetermined program.

To drill holes of different diameters from those drilled with drill 52d, a different drill is required. In high-speed automated operations, this is achieved by programming the table controls to reposition receptacle 51d beneath collet 56, actuate the spindle assembly 55 and collet 56 to position drill 52d in receptacle 51d, and release the drill. The table and spindle assembly 55 are then automatically repositioned relative to each other, so that collet 56 is directly over one of the other drills of the set 52a–52f. The spindle assembly 55 then lowers collet 56 over the appropriate drill 52a–52f and the collet grips the plastic shank of the drill. The spindle assembly 55 then lifts vertically and the table again automatically moves horizontally beneath the spindle assembly so that they are repositioned relative to each other with the circuit boards 53 beneath the new drill at the appropriate, predetermined point for drilling another hole. This automated operation continues without interruption until the programmed sequence is completed, and then the circuit boards 53 are removed, and new boards are installed for drilling according to the same, or a different, program.

The composite drills of this invention are especially suited to the high-speed, computer-programmed circuit board drilling sequences. The fine tolerances and reduced collet gripping pressures permit very rapid gripping and changing of drills, while, at the same time, the advantages of low breakage rates due to droppage through human error, or even occasional machine malfunctioning, are achieved. Moreover, the cost per drill can be substantially reduced because of the great reduction in expensive carbide or other conventional drilling material required. Further, it is very surprisingly found that drilling operations using the plastic shanked drills of this invention are indistinguishable in precision and accuracy from operations using the more expensive tungsten carbide drills, even after thousands of holes have been drilled with a given drill.

It will be apparent to those skilled in the art, that many other unique advantages can be achieved in accordance with this invention. The foregoing description is intended for illustrative purposes only, and the spirit and scope of the invention is to be limited solely by the attached claims.

I claim:

1. A drill for a precision drilling collet which comprises:
   (a) a rigid cylindrical insert having an attaching end portion and a working end portion, said working end portion having a cutting tip and drilling flutes intermediate the tip and the attaching end portion,
   (b) a cylindrical plastic shank molded in rigid attachment around said attaching end portion of said insert and shaped for compatible insertion in said collet,
   (c) means for eliminating axial and rotational slippage of said insert, relative to said plastic shank, when the drill is in use
   (d) said means for eliminating axial and rotation slippage comprising a segment of said attaching end portion shaped to render said attaching end portion substantially noncircular in cross section,
      said segment being fully encompassed by said plastic shank,
   (e) said segment including a key flat on the attaching end portion of said insert, said key flat comprising;
      a planar base positioned substantially parallel to the axis of said insert, and transverse surfaces positioned substantially transverse to the ends of said planar base, said transverse surfaces connecting said planar base to the outer surface of said attaching end portion of said insert.

2. A drill for a precision drilling collet which comprises:
   a rigid cylindrical insert having an attaching end portion and a working end portion,
      said working end portion having a cutting tip and drilling flutes intermediate the tip and the attaching end portion, a cylindrical plastic shank molded in rigid attachment around said attaching end portion of said insert and shaped for compatible insertion in said collet, and means for eliminating axial and rotational slippage of said insert, relative to said plastic shank, when the drill is in use, said means including a key flat on the attaching end portion of said insert, said key flat comprising a planar base positioned substantially parallel to the axis of said insert and transverse surfaces connecting said planar base to the outer surface of said attaching end portion, said transverse surfaces being positioned at least about one insert diameter from the tip of said attaching end portion and at least about one insert diameter from the intersection of the insert with the plastic shank.

3. A drill for a precision drilling collet which comprises:

a rigid cyclindrical insert having an attaching end portion and a working end portion, said working end portion having a cutting tip and drilling flutes intermediate the tip and the attaching end portion, a cylindrical plastic shank molded in rigid attachment around said attaching end portion of said insert and shaped for compatible insertion in said collet, and means for eliminating axial and rotational slippage of said insert, relative to said plastic shank, when the drill is in use, said means including a key flat on the attaching end portion of said insert, said key flat comprising a planar base positioned substantially parallel to the axis of said insert and transverse surfaces connecting said planar base to the outer surface of said attaching end portion, said planar base of said key flat being formed in the side of said insert at a depth from the outer surface of said insert in the range from about 30% to about 50% of the insert diameter.

4. A drill for a precision drilling collet which comprises:

a rigid cylindrical insert having an attaching end portion and a working end portion, said working end portion having a cutting tip and drilling flutes intermediate the tip and the attaching end portion, a cylindrical plastic shank molded in rigid attachment around said attaching end portion of said insert and shaped for compatible insertion in said collet, and means for eliminating axial and rotational slippage of said insert, relative to said plastic shank, when the drill is in use, said means including a key flat ranging in length from about 3/16" to about ¼" on the attaching end portion of said insert, said key flat comprising a planar base positioned substantially parallel to the axis of said insert and transverse surfaces connecting said planar base to the outer surface of said attaching end portion.

5. A drill for a precision drilling collet which comprises:

a rigid cylindrical insert having a diameter in the range from about 0.028" (0.70mm) to about 0.052" (1.30mm) and having an attaching end portion and a working end portion, said working end portion having a cutting tip and drilling flutes intermediate the tip and the attaching end portion, a cylindrical plastic shank molded in rigid attachment around said attaching end portion of said insert and shaped for compatible insertion in said collet, and means for eliminating axial and rotational slippage of said insert, relative to said plastic shank when the drill is in use, said means including a key flat on the attaching end portion of said insert, said key flat comprising a planar base positioned substantially parallel to the axis of said insert and transverse surfaces connecting said planar base to the outer surface of said attaching end portion.

6. A drill as recited in claim 5 wherein said insert comprises tungsten carbide.

7. A drill is recited in claim 5 wherein said insert comprises tungsten steel.

8. A drill as recited in claim 5 wherein said insert comprises cobalt steel.

9. A drill for a precision drilling collet which comprises:

a rigid cylindrical insert having an attaching end portion and a working end portion, said working end portion having a cutting tip and drilling flutes intermediate the tip and the attaching end portion, a cylindrical plastic shank comprising an injection-molded rigid plastic prepared from a synthetic resin molded in rigid attachment around said attaching end portion of said insert and shaped for compatible insertion in said collet, and means for eliminating axial and rotational slippage of said insert, relative to said plastic shank, when the drill is in use, said means including a key flat on the attaching end portion of said insert, said key flat comprising a planar base positioned substantially parallel to the axis of said insert and transverse surfaces connecting said planar base to the outer surface of said attaching end portion.

10. A drill as recited in claim 8, wherein said plastic is reinforced with a glass reinforcing agent.

11. A drill as recited in claim 10, wherein said reinforcing agent comprises from about 20% to about 60% by weight of said plastic shank.

12. A drill as recited in claim 11, wherein said plastic is prepared from polyphenylene sulfide, reinforced with from about 35% to about 45% by weight of glass fibers.

* * * * *